United States Patent

[11] 3,629,934

| [72] | Inventor | Hermann Wirl<br>Bruchasal/Baden, Germany |
|---|---|---|
| [21] | Appl. No. | 812,585 |
| [22] | Filed | Apr. 2, 1969 |
| [45] | Patented | Dec. 28, 1971 |
| [73] | Assignee | Scharringhausen Maschinenbau<br>Gesellschaft GmbH |
| [32] | Priority | Apr. 5, 1968 |
| [33] | | Germany |
| [31] | | P 17 52 117.4 |

[54] SHEET METAL WORKING MACHINE
18 Claims, 11 Drawing Figs.

[52] U.S. Cl. ..................................................... 29/564,
83/3, 83/581
[51] Int. Cl. ..................................................... B23p 23/00
[50] Field of Search............................................ 29/564;
83/3, 581; 90/96

[56] References Cited
UNITED STATES PATENTS

| 2,314,656 | 3/1943 | Morton | 90/96 X |
| 2,871,896 | 2/1959 | Markwell | 83/3 X |
| 2,936,663 | 5/1960 | Gautron | 83/3 |

*Primary Examiner*—Donald R. Schran
*Assistant Examiner*—Z. R. Bilinsky
*Attorney*—Otto John Munz ABSTRACT: A sheet metal working machine for cutting and edge-trimming of metal sheets and plates comprises the combination of a conventional seesaw shear having shear blades extending in parallel to one another and also having a pressure pad for holding the plates down with means for subsequent cutting-shaping of the plate edges to form V-, double V-, Y-, and U-formed butt joints for welding purposes.

The means consist of a guide way for a carriage, the guide way extending in parallel to the shear blades and being spaced from the shear blades so as not to obstruct the handling of the plates. A slide is supported on the carriage which slide is laterally displaceable thereon, and cutting tools are mounted on the slide.

During the cutting process the carriage idles on one side of the metal plate from where it is moved after cutting in parallel to the plate edge for shaping the plate edges to the desired form by driving means.

INVENTOR.
HERMANN WIRL

INVENTOR: HERMANN WIRL

FIG.8

SHEET METAL WORKING MACHINE

CROSS-REFERENCE TO RELATED APPLICATION

Applicant claims priority under 35 USC 119 for application P 17 52 117.4 filed Apr. 5, 1968 in the patent office of the Federal Republic of Germany.

BACKGROUND OF THE INVENTION

The present invention relates to a sheet metal working machine. More particularly, the invention relates to a machine for cutting and edge-trimming of metal sheets or plates and for preparing the edges of the plate portion remaining on the supporting table for a subsequent welding process by shaping the edges to form V-, double V-, Y-, or U-butt joints.

Preparing the metal plates for welding is even today done by first cutting the plates to the required size by means of shears or by means of a torch cutting device, with the type of shears employed depending mainly on the conditions prevailing in the particular work shop. If the sheets or plates are only to be trimmed, shears having circular shear blades can be used, since during this process it is of no importance whether the falling-off metal band bends in a screwlike manner. If, however, thicker plates are to be separated into two plate portions which are both to be worked further, the use of shears having circular shear blades becomes uneconomic. As has been mentioned, the metal band falling off from circular shear blades is rather heavily deformed and cannot be further worked without prior redressing.

Therefore, with thicker plates usually seesaw shears having shear blades which move in parallel to one another are used. These shears, the moving shear blade of which is usually inclined by approximately 4° relative to the stationary blade, leave the plate portions practically without deformation so that the portions can be further processed without any redressing or like operations.

After cutting and trimming the plates are still today transported from the shears to a bevel edge planing machine which is, of course, located at a different place. There the plate edges are shaped to the desired butt joints. This working method is extremely time-consuming and requires additional man power as well as the employment of transporting means and lifting gears and, of course, the installation of two machine tools that work according to two different methods.

In order to overcome this disadvantage it has already been suggested to replace the shear bars guided in vertical posts or prisms by a bar having the shape of the segment of a cylinder and to mount two shear blades on the cylindrical surface thereof, one above the other. The segment is made pivotable about two axes which are disposed remote from the cylindrical surface, as a consequence whereof the direction of movement of the shear blades near the plate edge is almost linear. The lower axis is assigned to the lower shear blade, the cutting blade, while the upper axis is assigned to the uppermost shear blade which shapes the edge to form the required butt joint. The pivoting movement of the uppermost shear blade continues through a plane which is inclined but tangential to the cutting surface. During one pivoting movement of the segment the pivoting axis is changed. As a consequence thereof, first the lower shear blade performs the cutting of the plate or trimming of the edge and secondly, thereafter, the uppermost shear blade shapes the edge to form the desired butt joint.

There is also known another type of seesaw shears having conventional guiding means for the shear bar, which guiding means, however, can be adjusted to an inclined position. After cutting, the guiding means are set to this inclined position and the movement of the shear bar is repeated. This produces an inclined cutting surface at the edge of the plate.

The above described machines can be used for preparing V- or Y-butt joints. Since, however, double V-butt joints are required as often as V- or Y-butt joints the plates remaining on the support table must necessarily be turned over in order to produce with these machines such double V-butt joints. After turning the plates they must, of course, again be adjusted to proper position. U-butt joints, however, cannot at all be cut with these machines. But not only this deficiency of the above-described type of seesaw shears is a disadvantage to which weight is given in praxi, it is also the relative high price of the equipment.

Further, there are known shears having circular shear blades. Some shears of this type have a second circular shear blade which trails the cutting shear blade, the axis of the trailing shear blade being inclined to the axis of the cutting blade. While cutting, the trailing blade removes the upper plate edge along the cutting surface, thereby shaping the edge to form a V- or Y-butt joint, depending on the adjustment of the machine. If a double V-butt joint is to be formed by these shears, the plates must also be turned over and, again, it is not possible to shape the plate edges to form a U-butt joint.

For this reason shears have been developed and are now available on the market wherein the trailing circular shear blade is replaced by a planing device on which a plurality of different planing tools or cutters can be mounted. Since the cutting circular shear blade has to be guided on a carriage or slide along the cutting line it is reasonable and obvious to arrange a planing device on this same carriage, thus making it possible to shape the edges of the plates to any desired form.

However, it remains an extreme disadvantage, that shears having circular shear blades cause a considerable deformation of the falling-off portions of the plate, as has been mentioned before, which renders such shears suitable for cutting metal sheets and plates only under certain limited conditions.

It is, therefore, the object of the present invention to provide a sheet metal working machine which is free from the above outlined disadvantages. More particularly, it is the object to provide such machine which makes it possible to cut the plates without any deformation worth mentioning of the falling-off plate portions and, in the same working process, to shape the edge of the plate portion remaining on the support table to any one of the customary butt joint forms.

SUMMARY OF THE INVENTION

These objects are attained by combining a conventional seesaw shear having shear blades which move in parallel relative to one another and also having a pressure pad for holding down the plates, with a device comprising a guide way for a carriage, which guide way extends in parallel to the shear blades and which carriage has cutting tools mounted thereon. The tools are adapted to shape the edges of the plates to any desired butt joint form, and the guide way is spaced from the shear blades so as to allow unobstructed handling of the plates. During the cutting process the carriage idles on one side of the machine from where it is moved, after cutting, in parallel to the plate edge by a driving gear, thereby shaping the plate edge.

The carriage can be provided with fixing means for at least one planing tool which is adjustable to the desired form of the butt joint; however, the carriage can also be provided with a device wherein at least one milling tool is mounted.

One preferred embodiment of the invented sheet metal working machine comprises a motor for driving the carriage. For example, a hydraulic motor to which a transmission is connected including a chain fastened to either side of the carriage and being supported by two return chain wheels.

For reasons of construction, however, the motor, complete with a gear box, can also be mounted rigidly on the carriage so that a driving pinion of the gear is in mesh with a rack extending in the direction of the guide way.

The guide way can be designed as a V-guide way or a guide way for rollers. The guide way can be arranged underneath a rail belonging to the machine body, however, it can also be arranged on or beneath the front side of the pressure pad.

In order to cut and shape by the invented machine both the front edge and the rear edge of the same plate without having to turn the plate around or having to turn it over it can prove expedient to provide two guide ways and carriages, one underneath the rail and the other one on the pressure pad.

If the invented machine is to be used for series production of cut and shaped metal plates it is sufficient if the carriage is provided with receptions for a plurality of differently adjusted planing tools and with bars and screws for securing the tools to the carriage.

However, if the invented machine is not to be used in series production, i.e., if plates of different thickness are to be cut by the machine, the edges of which plates are to form different butt joints, it is further suggested to provide a cross-slide on the carriage for at least one planing tool, the feed of the cross-slide in the direction towards the plate edge being accomplished after each working stroke of the carriage manually or automatically.

Whenever a plate edge is to be shaped to form a double V-butt joint it is necessary to move the plate slightly forward beyond the cutting line. For adjusting the plates for planing, an abutment can be provided behind this cutting line and appropriately spaced therefrom.

Since the cutting-shaping working process causes vibration in the machine body it is, further, suggested to fill the machine parts which support the means and tools for planing with concrete, which helps to dampen the vibrations.

DESCRIPTION OF THE DRAWINGS

The invention will be more readily comprehended from the following description when taken in conjunction with the appending drawings wherein two embodiments of the invention are illustrated, and wherein.

DESCRIPTION OF THE PREFERRED EMBODIMENTS

Referring now to the drawings in FIG. 1 to 4, the machine body 4 being welded together from posts 1,2 and a rail 3 (FIG. 2) is provided with a support table 5 whereon the plate 6 to be cut is placed. In front of a shear bar 8 which is guided in suitable guide means 7 is arranged a pressure pad 9 together with its hydraulically operated pressure pistons 10 and a hand guard 11. An upper shear blade 12 is secured to the lower edge of shear bar 8 and is inclined by 4° relative to the lower shear blade 14 which rests stationarily in the shear blade bed 13. Underneath of rail 3 there is provided a prismatic guide way 15 for a carriage 16, the guide way 15 being spaced from the shear blades so as to leave enough room for handling the plate 6. On carriage 16 is mounted a cross-slide 17, the lower surface of which being provided with grooves 18 adapted to receive three differently adjusted planing tools 19, 20, 21 are mounted on cross-slide 17.

Figure 8:
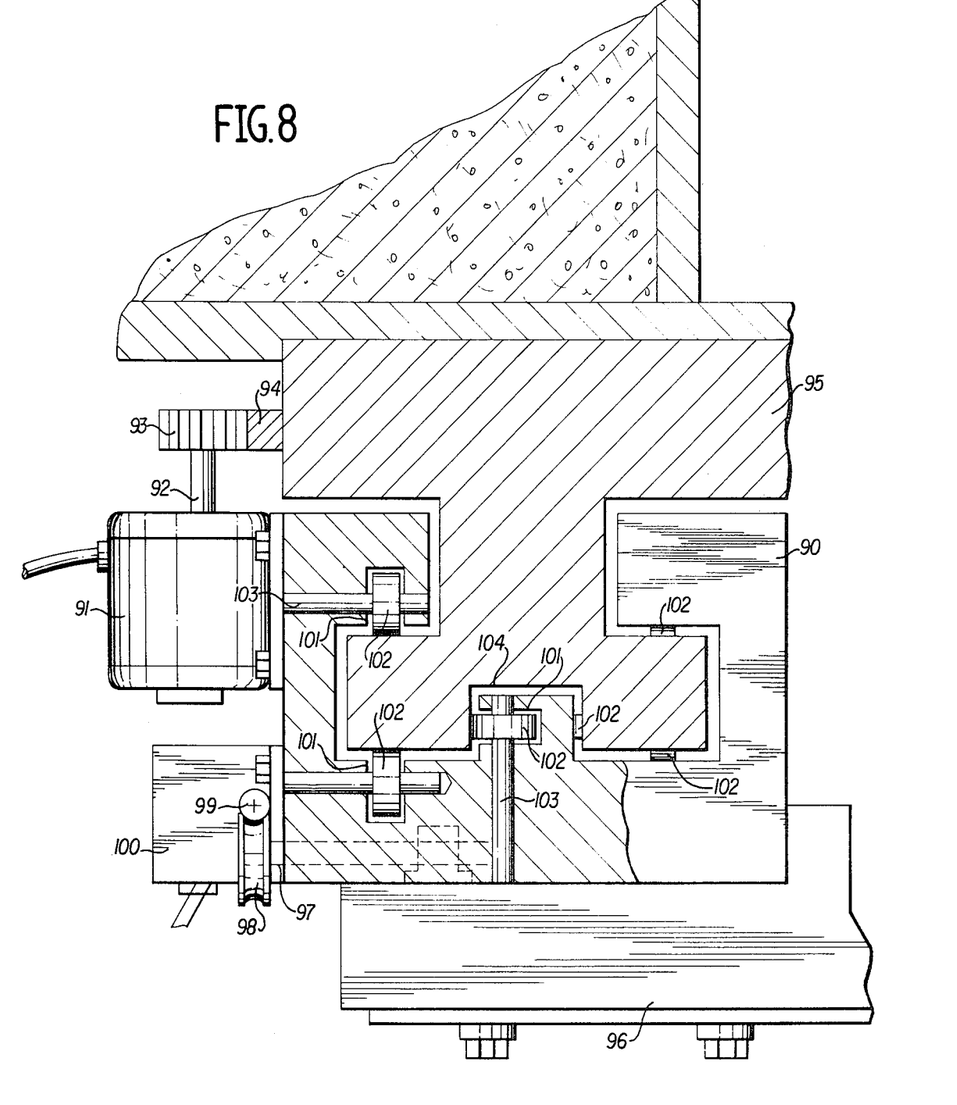
FIG. 8 is a partial cross section relating to FIGS. 1 and 5 showing details of an embodiment of the guideway carriage and cross-slide.
Figure 9:
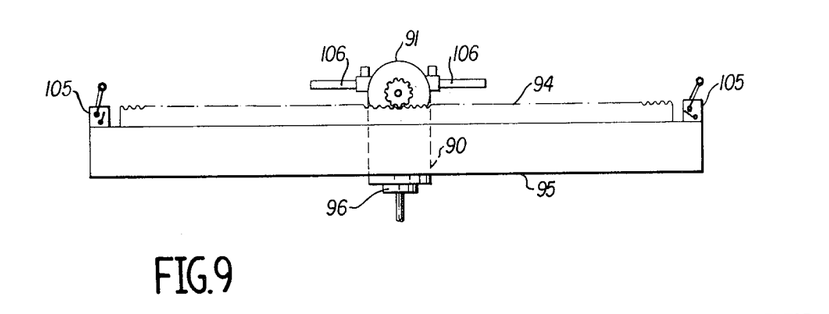
FIG. 9 is a schematic plan view of the guideway, gear rack, pinion, motor and limit switches showing an embodiment of the carriage drive.

The manner of operating the feed of cross-slide 17 is shown in the drawings FIGS. 8 and 9. This movement can be performed manually or automatically either by pushbutton control of motor 100 in manual or control of the motor 100 by the limit switches 105 on FIG. 9 in the automatic mode. The chain 24, of which the ends 25, 26 are fastened to either side of carriage 16 is being driven by a hydraulic motor 27 and is supported by a return chain wheel 28 arranged on the other side of the machine body 4.

Figure 1:
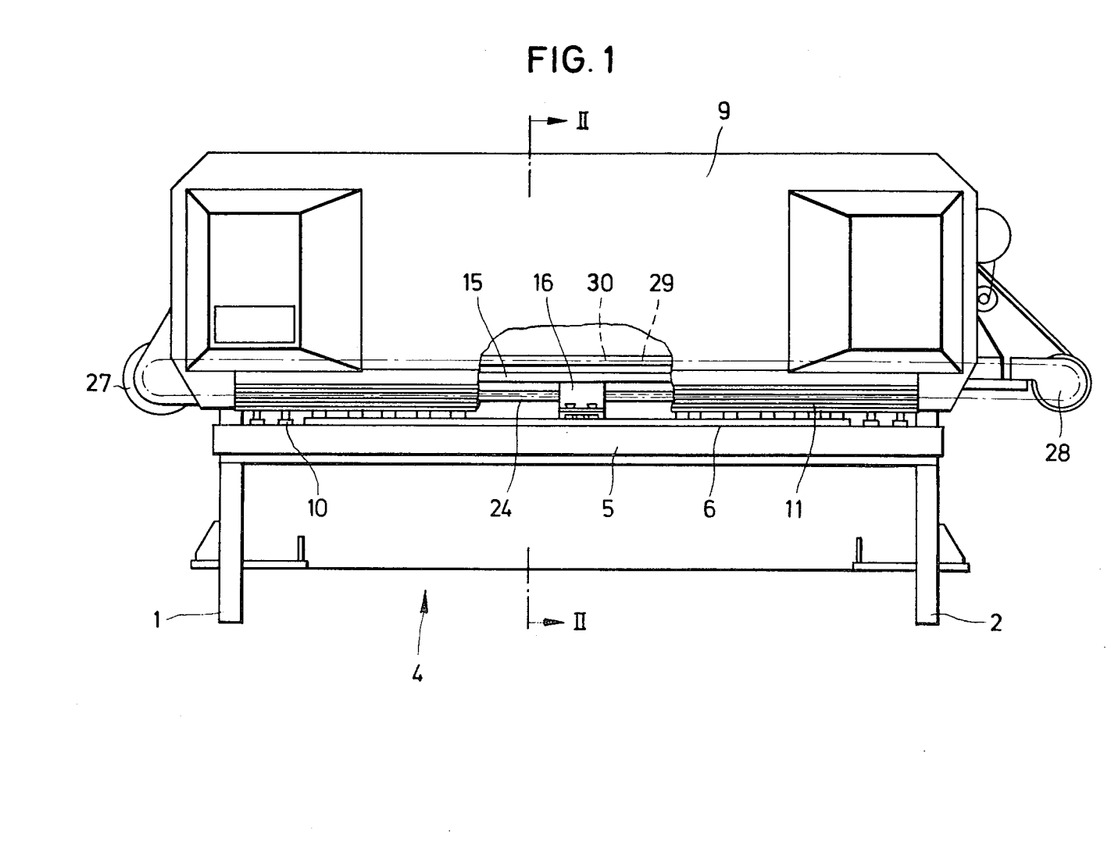
FIG. 1 is a front view of a sheet metal working machine having a planing device, partially cut.
Figure 1A:
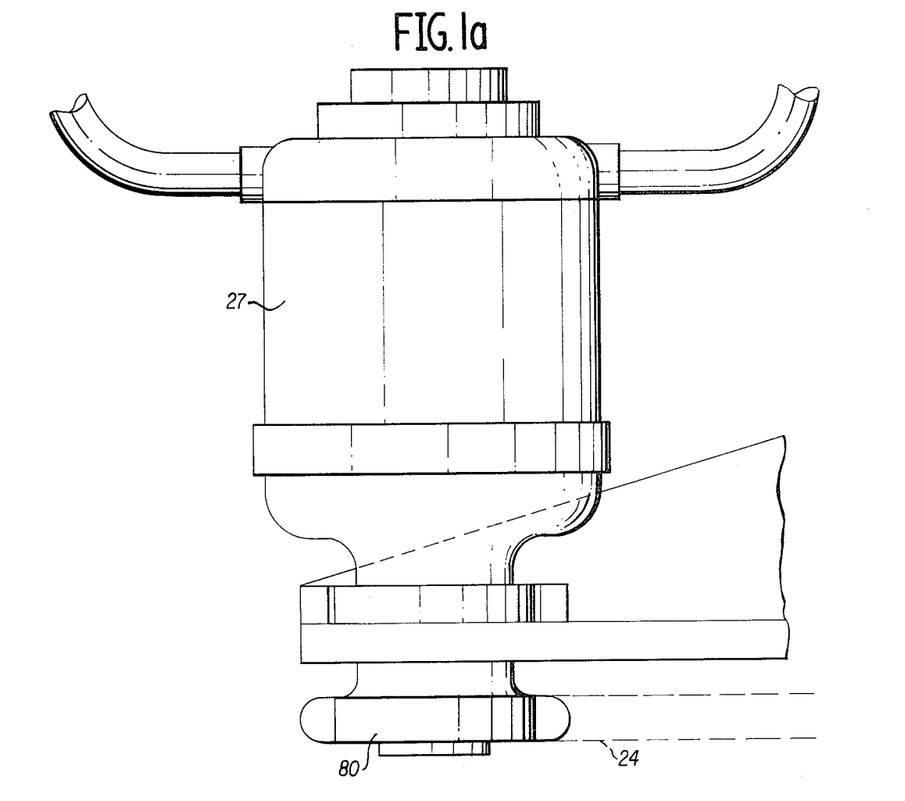
FIG. 1a is an auxiliary view to FIG. 1 showing the motor mounting and chain drive.
Figure 2:
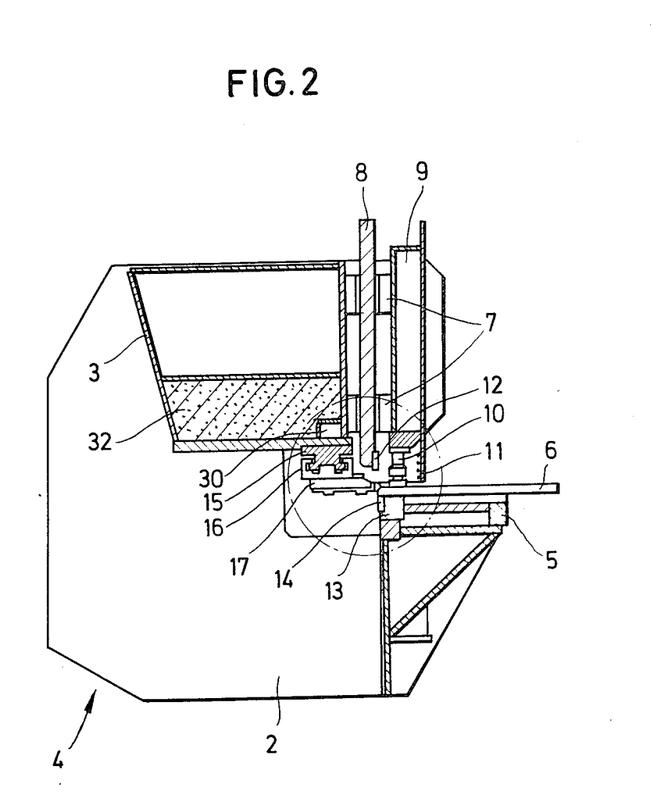
FIG. 2 is a sectional view cut along line II—II of FIG. 1.
Figure 3:
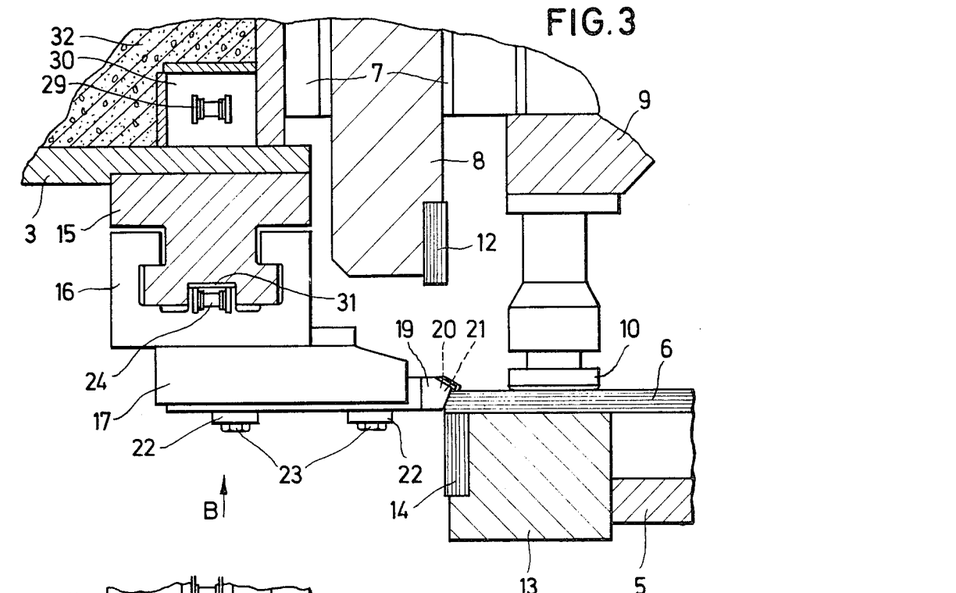
FIG. 3 is an enlarged view of a machine portion enclosed by a circle in FIG. 2.

The return portion 29 of chain 24 is guided in a chain guard 30 within rail 3. The lower surface of prismatic guide way 15 is provided with a groove 31 extending in the direction of the guide way wherein the chain 24 moves.

Since the planing process causes vibrations which are only to some extent absorbed by rail 3 and which can lead to a resonance in the machine body, the rail 3 is at least partially filled with concrete in order to damp these vibrations.

Figure 5:
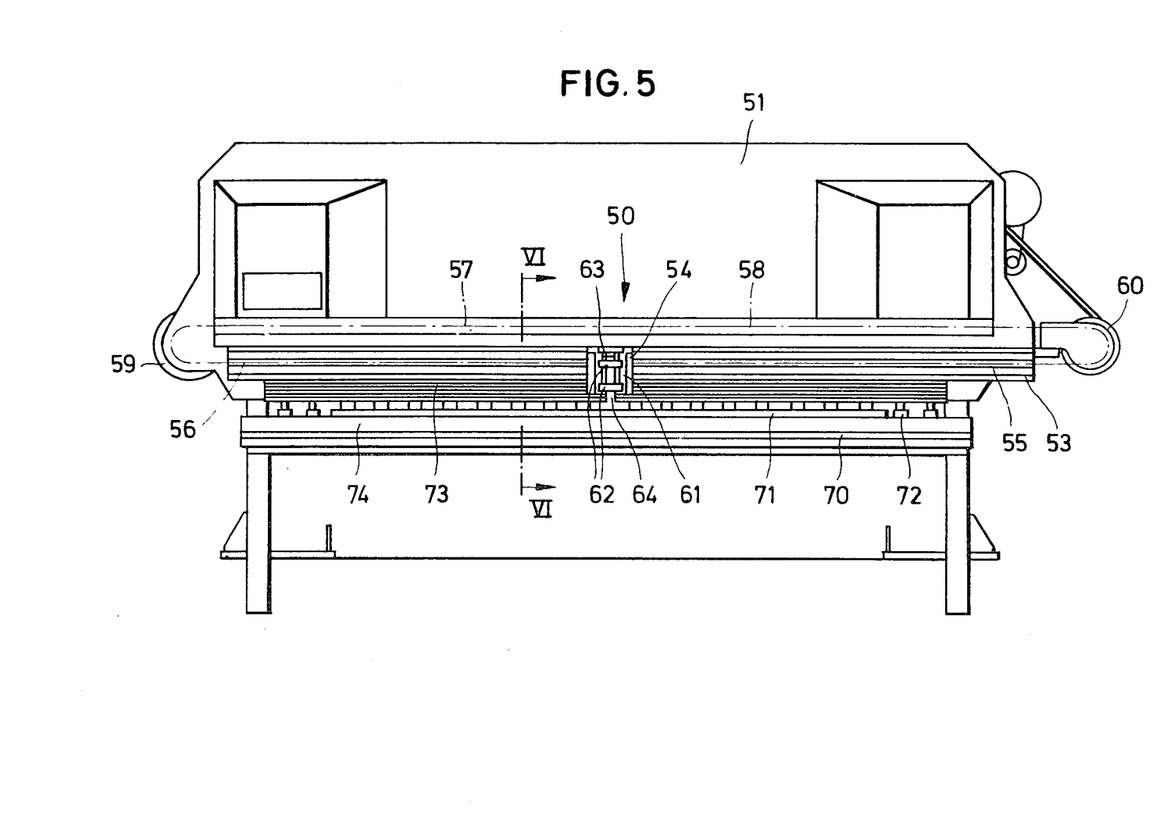
FIG. 5 is a front view of a second embodiment of the sheet metal working machine having a planing device.
Figure 6:
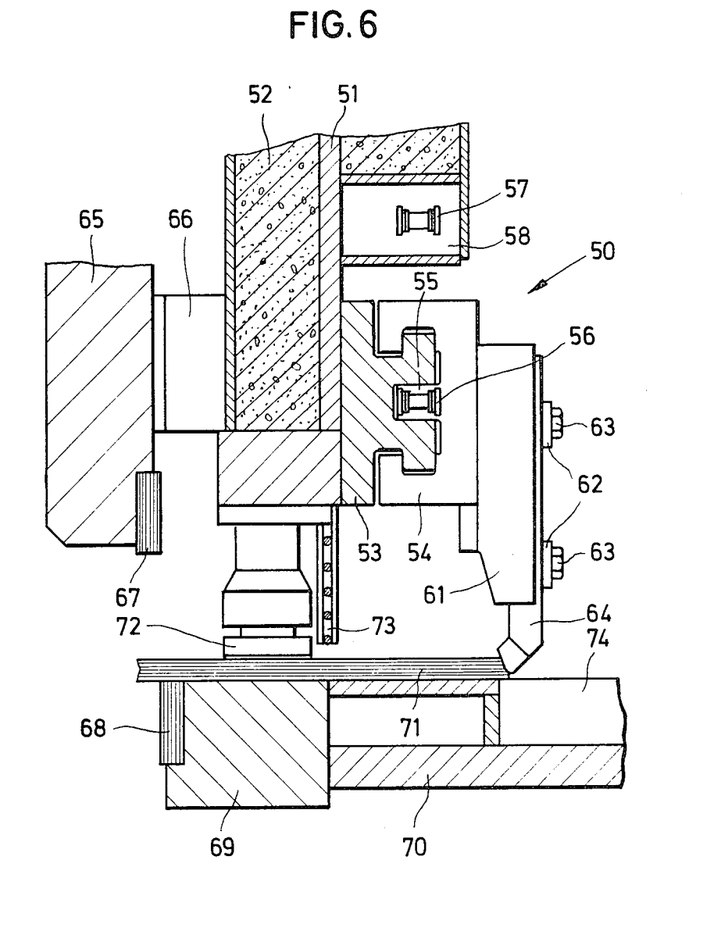
FIG. 6 is an enlarged sectional view of a machine cut along line VI—VI of FIG. 5.

In the embodiment illustrated in FIGS. 5 and 6 the planing device 50 is arranged on the pressure pad 51 which, again, is filled with concrete 52 for the purpose of damping the vibrations. The prismatic guide way 53 carrying the carriage 54 is arranged on the lower front surface of pad 51 and is provided with a groove 55 extending in the direction of the guide way, which groove is adapted to house the roller chain 56.

In this embodiment also, the roller chain 56 is driven by a hydraulic motor 59 (FIG. 5), mounted on one side of the pressure pad 51. On the other side the chain 56 is supported on a return chain wheel 60 and the returning portion 57 of chain 56 is being guided in a chain guard 58.

On carriage 54 is mounted a cross-slide 61 which is displaceable thereon in vertical direction. A planing tool 64 is being secured to the slide by means of bars 62 and screws 63.

A shear bar 65 on which the upper shear blade 67 is mounted is movable in guide means 66. The stationary shear blade 68 is embedded in the shear blade bed 69 which is a portion of the support table 70 whereon the plate 71 rests.

Hydraulically operated pressure pistons 72 keep plate 21 down on table 70. The hand guard is being denoted by number 73. In front of the planing device a cavity 74 is provided extending in parallel direction to the path of the planing tool 64.

Figure 4:
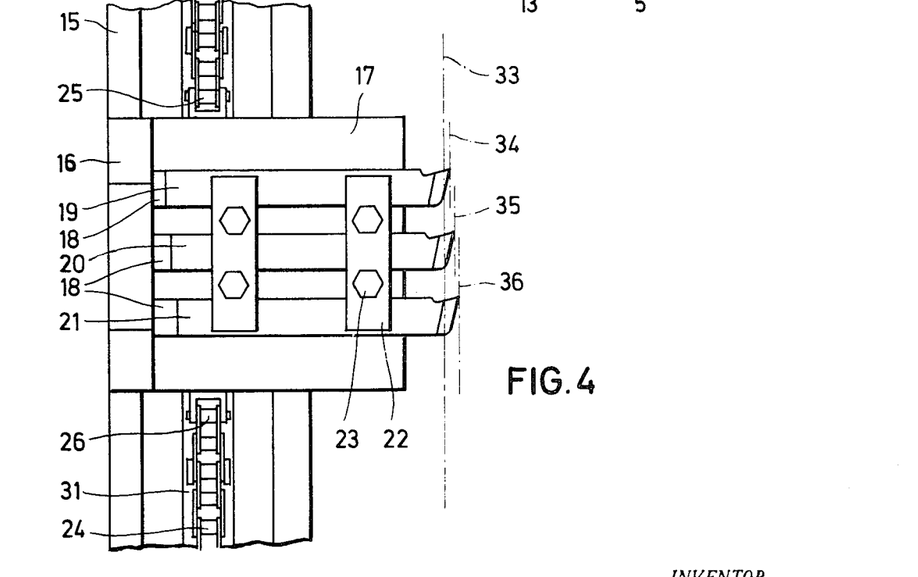
FIG. 4 is a view of a machine portion in the direction of arrow "B" in FIG. 3.

The way in which a sheet metal working machine of the first described embodiment being illustrated in the FIGS. 1 to 4 is operated and the manner in which it functions is as follows:

First the planing tools 19, 20, 21 which are selected according to the desired form of butt joints are adjusted by means of a gage. It is to be assumed that in the illustrated embodiment a V-butt joint is to be prepared. Therefore already the planing tool 19 is to be adjusted to the greatest possible depth of cut in order to relief as much as possible the lagging tool 20 which has to accomplish a much broader cut, and the adjustment of tool 21 is to be performed likewise. In FIG. 4, both the cutting plane 33 and the upper edges of the cutting surfaces 34, 35, 36 produced by the tools 19, 20, 21 are shown in dash-dot lines.

Then the plate to be cut is placed on the support table 5 while the shear bar 8 is in its upper position. The plate is then positioned properly relative to the shear blades either according to marks on the plate or by moving it against an abutment, not shown in the drawing.

Thereafter plate 6 is pressed down on the support table 5 by the hydraulically operated pistons 10 of pressure pad 9, and the cutting process is performed by moving the shear bar 8 downwards.

During the operations described so far the carriage 16 idles at the end of guide way 15 next to the return chain wheel 28 so as not to interfere with the plate portion placed beyond the cutting line. The chain 24 is also arranged so as not to obstruct free handling of plate 6.

After the cutting process the hydraulic motor 27 is switched on by suitable control means such as a hydraulic control valve, not shown in the drawings for sake of simplicity. As a result, carriage 16 with the planing tools 19, 20, 21 is moved along the just cut edge of plate 6. During this working stroke each one of the tools cuts off a chip of which the thickness corresponds to the adjustment of each tool.

In the event of plate 6 being rather thin, thus being in effect more a sheet than a plate, preparation of the edge can be accomplished by one working stroke of carriage 16. If however, a thicker plate is to be prepared cross-slide 17 must be displaced laterally according to the butt joint which is to be prepared. If cross-slide 17 is designed for manual feed it can be provided with a tool mount which is liftable during the return stroke of carriage 16. However, if cross-slide 17 is made for automatic feed a liftable tool mount can be dispensed with, because the automatic control device can be designed so as to retract the tool mount during the return movement of carriage 16.

Preparation for a double V-butt joint requires moving of plate 6 beyond the cutting line against a submerging abutting rail shows schematically in FIG. 2 numbers 15a–16a and 17a after the cutting process and after release of the pressure pistons 10, the rail being spaced slightly from the lower shear blade 14 and extending in parallel thereto. Plate 6 is then again pressed down on the support table 5 by the pistons 10 and the abutting rail is withdrawn. Now the edge of plate 6 is free and planing can be performed. Of course the tools should be mounted so as to enable a cutting of the edge from above and from below at the same time.

Up to the cutting process the operation and function of a sheet metal working machine as illustrated in FIGS. 5 and 6 is similar to the operation and function of a machine as illustrated in the FIGS. 1 to 4. Here again during the cutting process the carriage 54 rests at the end of guide way 53 next to the return chain wheel 60 so as not to obstruct handling of the plate 71.

After release of the pistons 72 plate 71 is adjusted with its edge which is opposite to the cutting edge relative to the path of planing tool 64. This can be done either with the help of marks on the plate or by moving the plate against a submerging abutting rail (not shown). Depending on whether the cutting edge or the edge which is parallel thereto is the reference line the abutting rail can be arranged in an appropriate distance from the lower shear blade 68 or in the cavity 74 of the supporting table 70.

Figures 7, 7A:
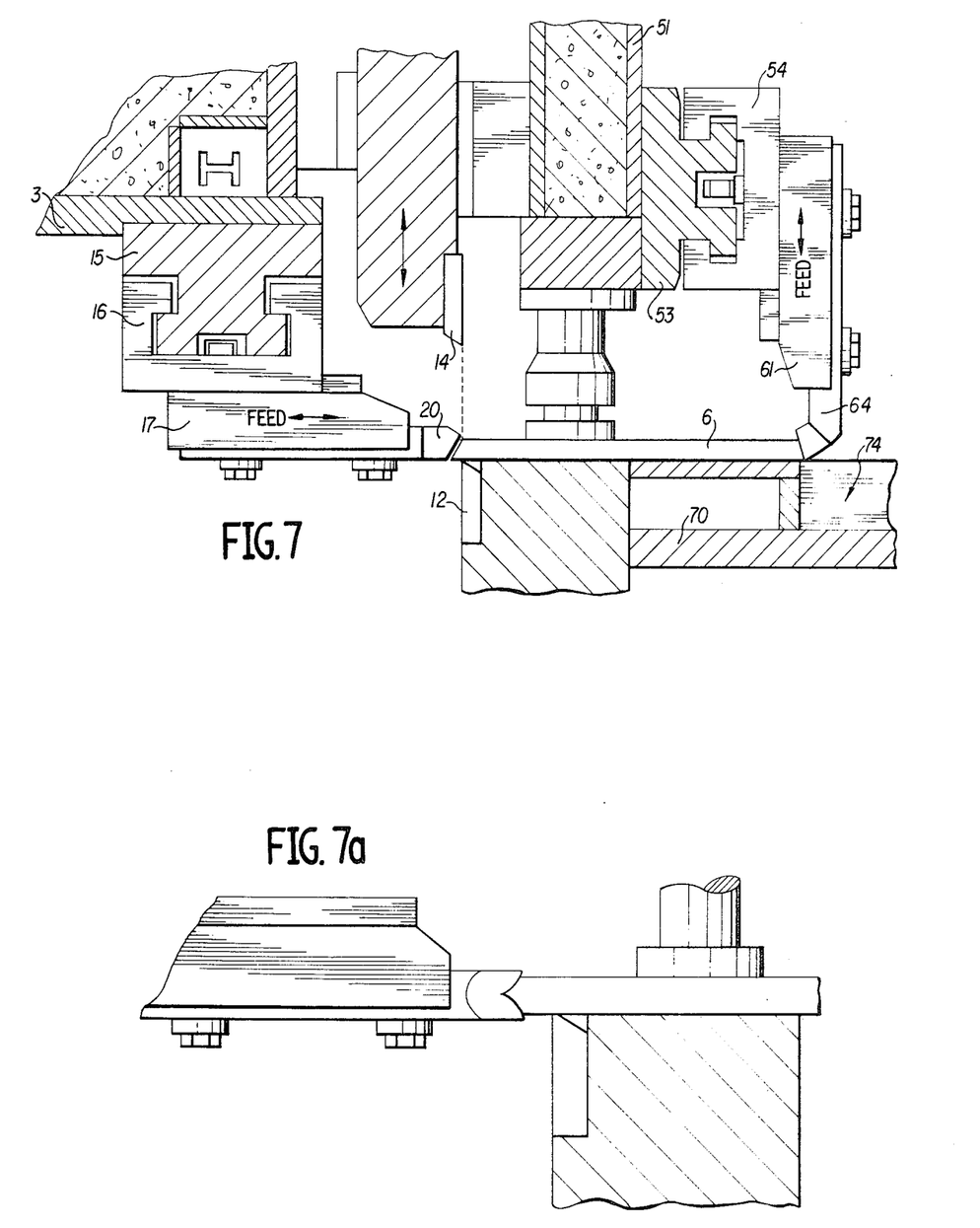
FIG. 7a is an auxiliary view to FIG. 7 showing the use of a tool to form a double V-butt welding joint.

FIG. 7a pictures an alternative embodiment of the invention how the embodiment shown in FIG. 7 may be utilized to shape a double V-joint on the plate to be machined by substituting cutting tool 20a for cutting tool 20.

FIG. 8 illustrates the embodiment of the invention where the chain drive is replaced by a rack and pinion drive, where 92 is the drive motor, mounted on the carriage 90, 92 the motor shaft on which is mounted the drive pinion 93. The pinion engages with gear rack 94 which is mounted on the guide way 95 bolted to the rail 3.

FIG. 8 also illustrates the roller-type of bearing where a plurality of bearing rollers 102 on bearing pivots 103 are journaled in the carriage 90, holding it in relation to guideway 95, permitting the carriage 90 to move easily on guideway 95.

FIG. 8 further illustrates an embodiment of the invention by which tool cross-slide 96 may be positioned and retracted and is feed in relation to the sheet and plate edges to be shaped and formed. The movements may be performed at will by operator or automatically. Motor 100 is bolted to the carriage 90. The motor may be actuated by the operator by an on and off switch manually or by limit switches 105 and limit switch actuator 106 shown on FIG. 9 in an automatic mode. On the motor 100 is rotatably mounted worm 99, engaging worm wheel 98. The worm wheel is mounted on a feed screw 97, engaging a feed nut 107 bolted to tool cross-slide 96.

FIG. 9 is a semischematic plan view showing the embodiment of the invention illustrating the arrangement for the automatic feed and retraction of tool cross-slide 96 on carriage 90.

What is claimed is:

1. A sheet metal working machine for cutting metal sheets and plates and for trimming the plate edges to form V-, W-, Y-, and U-butt joints for a subsequent welding process, said machine comprising in combination: a table shear having: a stationery shear blade (14) and a second vertically reciprocating shear blade (12) movable in parallel adjacent and relative to the stationery blade; a pressure pad (9) for holding down said plates during the cutting process,     a guide way (15) being arranged underneath a rail (3) of the machine body, said guide way extending in parallel to said shear blades and being sufficiently spaced therefrom to allow unobstructed handling of said plates,     a carriage (16) movably mounted on said guide way, driving means being connected to said carriage, and means on said carriage for mounting thereon cutting tools for shaping said plate edges to form the desired butt joint.

2. A sheet metal working machine as claimed in claim 1, wherein said means for mounting said cutting tools on said carriage include means for holding at least one particular tool for a V-, double V-, Y- and U-butt joint.

3. A sheet metal working machine as claimed in claim 1, wherein said tools adapted to shape said plate edges to form the desired butt joints are planing tools (19,20,21).

4. A sheet metal working machine as claimed in claim 1, wherein said tools adapted to shape said plate edges to form the desired butt joints are milling tools.

5. A sheet metal working machine as claimed in claim 1, wherein said means for driving said carriage include a motor (27), a gear, and chain (24), means to secure the ends of said chain to either side of said carriage, and a return chain wheel (28) being provided for supporting said chain.

6. A sheet metal working machine as claimed in claim 5, wherein said motor is a hydraulic motor.

7. A sheet metal working machine as claimed in claim 1, wherein said means for driving said carriage comprises a motor and a gear mounted on said carriage, said gear including a pinion, and a rack mounted on the guide way in parallel to said shear blades, said pinion being in mesh with said rack.

8. A sheet metal working machine as claimed in claim 1, wherein said guide way is a prismatic guide way.

9. A sheet metal working machine as claimed in claim 1, wherein said guide way is a roller guide way.

10. A sheet metal working machine as claimed in claim 1, wherein said carriage has a plurality of grooves (18), to receive a differently adjusted planing tool, and bars (22) and screws (23) being provided for securing said planing tools in said grooves.

11. A sheet metal working machine as claimed in claim 1, and further comprising a cross-slide (17) on said carriage (16), means to displace said cross-slide thereon in the direction towards said plate edge, and said slide being further provided with means for holding at least one cutting tool.

12. A sheet metal working machine as claimed in claim 11, wherein said cross-slide is manually displaceable.

13. A sheet metal working machine as claimed in claim 11, wherein said cross-slide is automatically displaceable.

14. A sheet metal working machine as claimed in claim 11, wherein said means for holding said cutting tool is at one end retractable on said cross-slide (17) during the return movement of said carriage (16).

15. A sheet metal working machine as claimed in claim 1, and further comprising an abutting rail being arranged in parallel to said shear blades equipped with a V-form cutting tool and being spaced therefrom sufficiently to allow shaping of said plate edge to form a double V-butt joint.

16. A sheet metal working machine as claimed in claim 1, wherein the rail (3) above said guide way (15) is filled with concrete.

17. A sheet metal working machine for cutting metal sheets and plates and for trimming the plate edges to form V-, W-, Y-, V-, W-, Y-, U-butt joints for a subsequent welding process, said machine comprising in combination: a table shear having: a stationary shear blade (14) and a second vertically reciprocating shear blade (12) movable in parallel adjacent and relative to the stationery blade; a pressure pad (9) for holding down said plates during the cutting process,     a guide way (53) being arranged on said pressure pad, said guide way extending in parallel to said shear blades and being sufficiently spaced therefrom to allow unobstructed handling of said plates, said shear table provided with a cavity (74) extending in parallel to said shear blades, to clear said tools, a carriage, (54) means to move said carriage on said guide way, driving means (56,59,60) being connected to said carriage, and means (61) being provided on said carriage for mounting thereon cutting tools to shape said plate edges to form the desired butt joints.

18. A sheet metal working machine for cutting metal sheets and plates and for trimming the plate edges to form V-, W-, Y-, and U-butt joints for a subsequent welding process, said machine comprising in combination: a table shear having: a stationery shear blade (14) and a second vertically reciprocating shear blade (12) movable in parallel adjacent and relative to the stationery blade; a pressure pad (9) for holding down said plates during the cutting process, guide ways being arranged underneath a rail of the machine body and on said pressure pad, said guide ways extending in parallel to said shear blades and being sufficiently spaced therefrom to allow unobstructed handling of said plates, a carriage being movable on each guide way, driving means being connected to each carriage, and means on each carriage for mounting thereon cutting tools to shape said plate edges to form the desired butt joint.

* * * * *